United States Patent
Cho

[11] Patent Number: 5,929,915
[45] Date of Patent: Jul. 27, 1999

[54] INTERLACED BINARY SHAPE CODING METHOD AND APPARATUS

[75] Inventor: Sung-Ryul Cho, Seoul, Rep. of Korea

[73] Assignee: Daewoo Electronics Co., Ltd., Seoul, Rep. of Korea

[21] Appl. No.: 08/984,033

[22] Filed: Dec. 2, 1997

[51] Int. Cl.[6] .................................................. H04N 7/32
[52] U.S. Cl. ........................ 348/416; 348/413; 348/699; 386/111; 382/238
[58] Field of Search .................................. 348/400–401, 348/410–416, 699, 402; 382/236–238; 386/111; H04N 7/32, 7/30

[56] References Cited

U.S. PATENT DOCUMENTS

| | | | |
|---|---|---|---|
| 4,546,386 | 10/1985 | Matsumoto et al. ..................... | 348/412 |
| 5,534,927 | 7/1996 | Shishikui et al. ....................... | 348/400 |
| 5,666,461 | 9/1997 | Igarashi et al. ......................... | 348/400 |
| 5,740,283 | 4/1998 | Meeker ................................... | 382/248 |
| 5,751,363 | 5/1998 | Miyamoto ............................... | 348/416 |
| 5,859,668 | 1/1999 | Aono et al. ............................. | 348/416 |

*Primary Examiner*—Howard Britton
*Assistant Examiner*—Vu Le
*Attorney, Agent, or Firm*—Anderson, Kill & Olick, P.C.

[57] ABSTRACT

A method for encoding a binary shape signal determines as a mode of a target block a first and a second modes, if errors of the target block with respect to a first and a second reference blocks are not greater than a predetermined threshold, respectively. If the mode is not determined, the target block is motion estimated and compensated, a motion compensation error(MCE) and a motion vector difference (MVD) are calculated and the MVD is encoded if the MVD is not zero. Then the mode of the target block is set to a third mode if the MVD is zero and the MCE is not greater than the threshold and a fourth mode if the MVD is not zero and the MCE is not greater than the threshold. If the mode is not determined, intra-coded data and inter-coded data are generated, and the number of bits of the intra-coded data is compared with the one of the inter-coded data. If the number of bits of the intra-coded data is not greater than the one of the inter-coded data, the mode of the target block is decided to a fifth mode. If the mode is not decided, the mode of the target block is decided to a fifth mode if the MVD is zero and a seventh mode if the MVD is not zero. Encoded data of the target block is generated based on the mode thereof.

20 Claims, 6 Drawing Sheets

INTERLACED BINARY SHAPE CODING METHOD AND APPARATUS

FIELD OF THE INVENTION

The present invention relates to a method and apparatus for coding a binary shape signal; and, more particularly, to a method and apparatus for coding an interlaced binary shape signal.

DESCRIPTION OF THE PRIOR ART

A binary shape signal, representing the location and shape of an object, can be expressed as a binary alpha block(BAB) of, e.g., 16×16 binary pixels within a frame (or a VOP), wherein each binary pixel has a binary value, e.g., 0 or 255 representing either a background pixel or an object pixel. A BAB can be encoded by using a conventional bit-map-based shape coding method such as a context-based arithmetic encoding (CAE) method.

For instance, for an intra-frame, a current BAB is encoded by using a conventional intra-CAE method, wherein each pixel in the current BAB is arithmetically coded based on an intra-context composed of a set of pixels selected from a current frame. For an inter-frame, the current BAB may be coded by the intra-CAE or a inter-CAE technique depending on which CAE technique generates a less amount of encoded data. According to the inter-CAE technique, an error representing a difference between the current BAB and each of predetermined candidate BAB's thereof included in a previous frame is calculated first and a most similar candidate BAB and a motion vector are found by a motion estimation technique, wherein the most similar candidate BAB represents a candidate BAB generating a least error among the candidate BAB's and the motion vector denotes a displacement between the current BAB and the most similar candidate BAB. Thereafter, each pixel in the current BAB is arithmetically coded based on an inter-context and a motion vector difference(MVD) representing a difference between the motion vector and a motion vector predictor (MVDP) thereof is encoded by using, e.g., a variable length coding(VLC) scheme, wherein the inter-context is composed of two subset of pixels, a subset of pixels being selected in the current frame and the other subset of pixels being chosen from the previous frame based on the motion vector. For further details of the CAE techniques and the MVD, please refer to *MPEG-4 Video Verification Model Version* 7.0, International organization for Standardization, Coding of Moving Pictures and Associated Audio Information, ISO/IEC JTC1/SC29/WG11 MPEG97/N1642, Bristol, April 1997.

In order to further enhance the coding efficiency of the binary shape signal, one of the mode signals listed in Table 1 is assigned for each BAB.

TABLE 1

| coding modes | |
| --- | --- |
| mode 1 | MVD==0 && No Update |
| mode 2 | MVD!=0 && No Update |
| mode 3 | all 0 |
| mode 4 | all 255 |
| mode 5 | intra-CAE |
| mode 6 | MVD==0 && inter-CAE |
| mode 7 | MVD!=0 && inter-CAE |

The mode 1 represents that an MVD for a BAB is zero and the BAB can be represented by a most similar candidate BAB thereof, whereas the mode 2 indicates that an MVD for a BAB has a value other than zero and the BAB can be represented by a most similar candidate BAB. For the BAB of mode 1 only the mode signal is encoded and the BAB of mode 2 is represented by the mode signal and the MVD thereof. In determining "No Update", a difference BAB is formed by a difference between each pixel of the most similar BAB and a corresponding pixel thereof in the current BAB and it is checked whether an error of any of the 4×4 subblocks of 4×4 pixels included in the difference BAB is less than a predetermined threshold, an error of a subblock being, e.g., a sum of absolute pixel values within the subblock. If error values of all the subblocks are equal to or less than the threshold, the BAB is declared as of mode 1 or 2 depending on the value of MVD thereof.

Similarly, if an error for any 4×4 subblock is equal to or less than the threshold when the pixels in a BAB are all changed to 0, the BAB is coded as an "all_0" mode, i.e., mode 3. If the error for any 4×4 subblock is equal to or less than the threshold when the pixels in a BAB are all changed to 255, the BAB is coded as an all_255 mode, i.e., mode 4. For a BAB of the mode 3 or 4, only the mode signal is encoded for the BAB. When a BAB does not belong to anyone of the modes 1 to 4, "intra-CAE" or "inter-CAE" is employed for coding of the BAB, wherein a BAB of mode 5 is represented by the mode signal and intra-CAE coded BAB data. A BAB of mode 6 is represented by the mode signal and inter-CAE coded BAB data; and a BAB of mode 7 is represented by the mode signal, inter-CAE coded BAB data and an MVD.

Figure 1A:
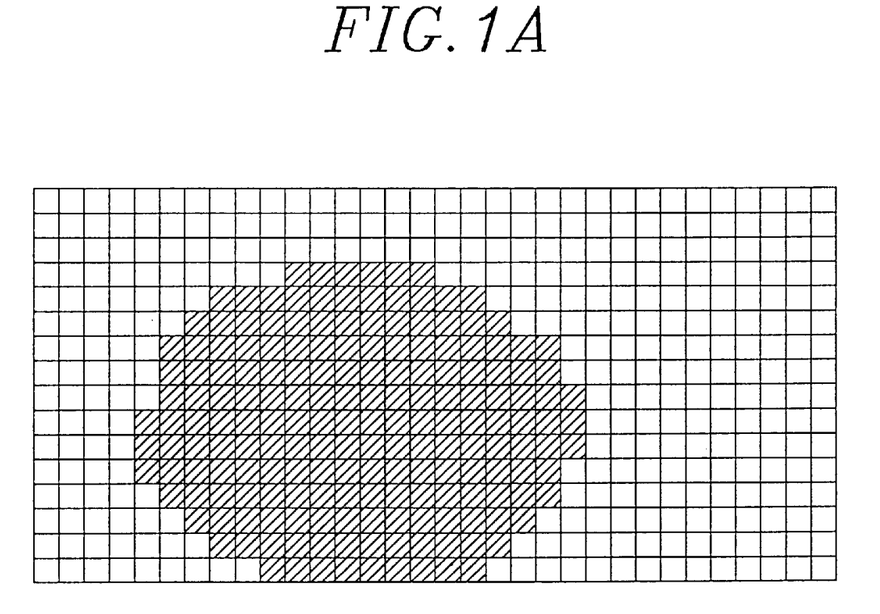
FIGS. 1A, 1B and 1C depict a top field, a bottom field and a frame of a binary shape signal, respectively.
Figure 1B:
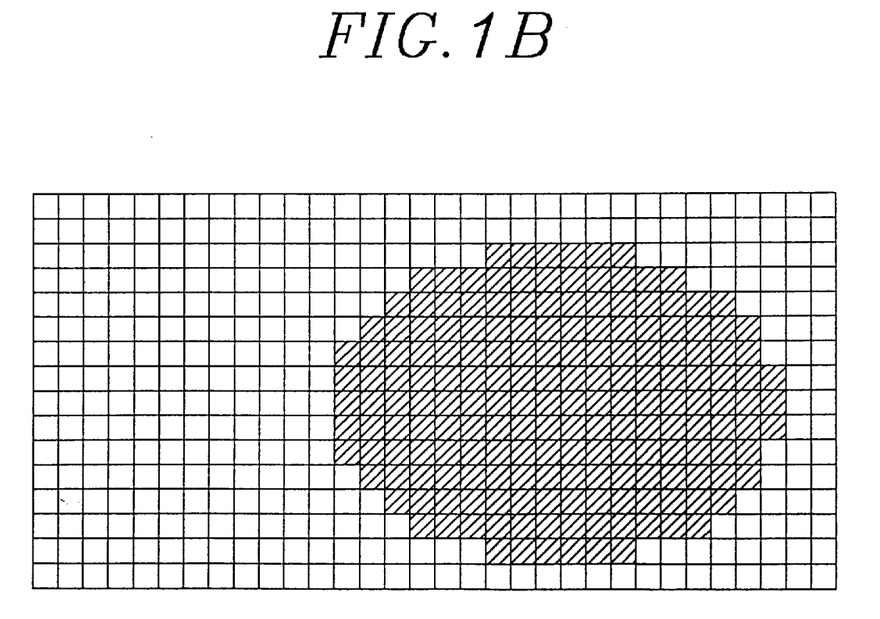
Figure 1C:
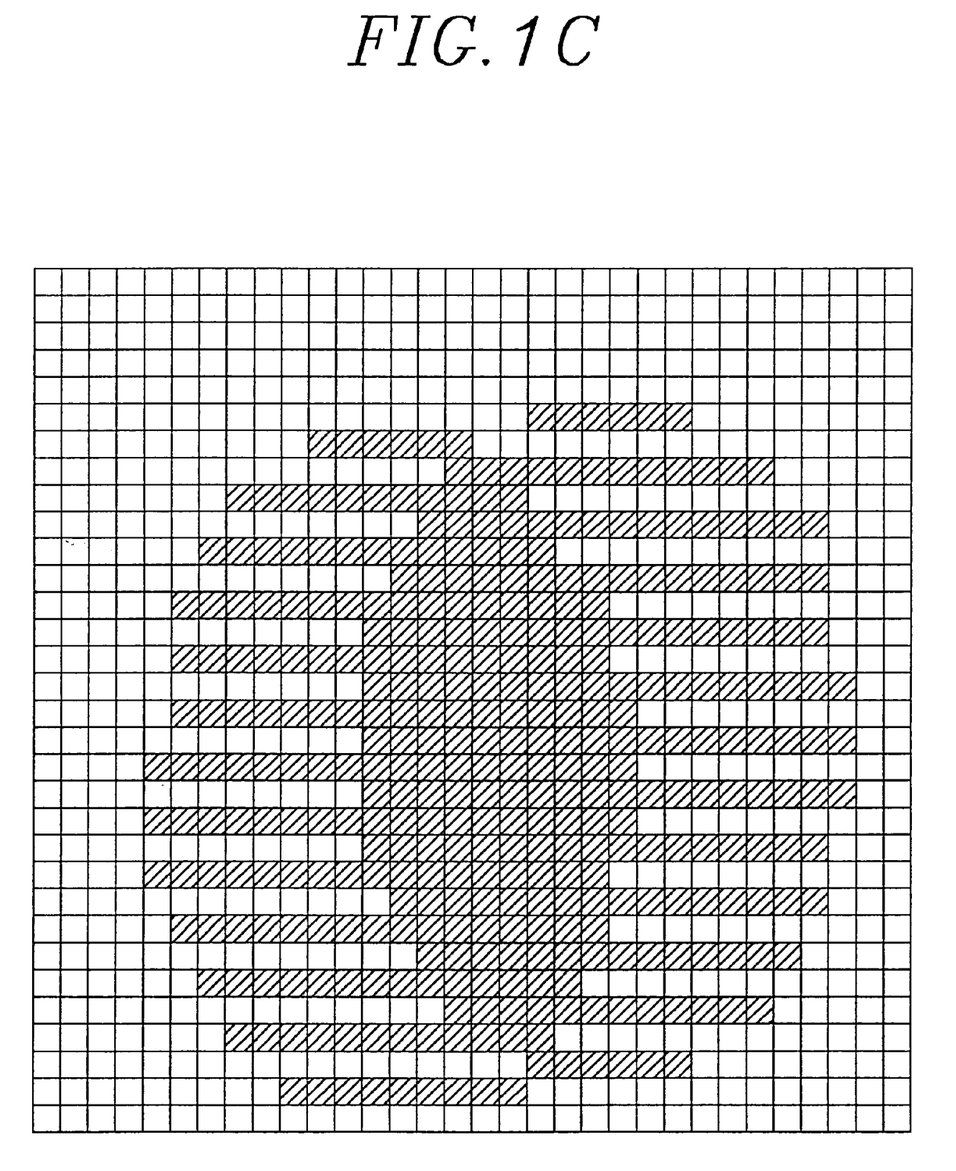

In MPEG-4, the mode determination scheme described above has been suggested in encoding a binary shape signal on a frame-by-frame basis rather than on a field-by-field basis and a method and apparatus for enabling the coding of the binary shape signal is not disclosed therein. In coding a binary shape signal on the frame-by-frame basis, a coding efficiency is depreciated if a motion of an object within a frame or a VOP is considerably large. Referring to FIGS. 1A to 1C, there is illustrated an object having a large motion, represented in fields and a frame, respectively.

FIG. 1A depicts a top field; FIG. 1B, a bottom field; and FIG. 1C, a frame in a binary shape signal, wherein each of squares within the fields and the frame is a pixel, a shaded square being a pixel in the object, and a white one being a pixel in a background. The frame is made by arranging each row of the fields one after the other, that is, for example, rows of the top field are located at even rows of the frame having 0th to (2N−1)st rows therein and rows of the bottom field are located at odd rows of the frame each field having N rows therein with N being a positive integer. The conventional binary shape signal coding technique employing the progressive coding method encodes a binary shape signal on the frame-by-frame basis. However, when the motion of the object in the frame is large as shown in FIGS. 1A to 1C, a binary shape signal whose spatial correlation is very low is encoded, resulting in a depreciated coding efficiency.

Hitherto, none of the prior art references discloses a method and apparatus for enabling the coding of the binary shape signal on a field basis.

SUMMARY OF THE INVENTION

It is, therefore, a primary object of the invention to provide a method and apparatus for use in encoding a binary shape signal.

Another object of the present invention is to provide a method and apparatus, for use in encoding a binary shape signal on a field-by-field basis, capable of improving a coding efficiency.

In accordance with one asepct of the present invention, there is provided a method for encoding a target block of a binary shape signal, wherein the binary shape signal includes a plurality of pictures and each picture is divided into a multiplicity of blocks of M×N pixels having one of a first and a second binary values, the target block representing one of the blocks of a current picture to be encoded and M and N being positive integers, respectively, comprising the steps of: (a) determining, as a mode of the target block, a first mode if an error of the target block with respect to a first reference block is not greater than a predetermined threshol and a second mode if an error of the target block with respect to a second reference block is not greater than the threshold, respectively, the respective reference blocks having M×N pixels and all pixels of the first and the second reference blocks being of the first and the second binary values, respectively; (b) if none of the first and the second modes is determined in step (a), motion estimating and compensating the target block with reference to one or more previous pictures of the current picture to thereby generate motion vector information including a motion vector and a motion compensated block, the motion compensated block including a most similar block of the target block; (c) calculating a motion compensation error(MCE) between the target block and the most similar block and a motion vector difference(MVD) between the motion vector and its predictor; (d) encoding the MVD if the MVD is not zero to provide encoded MVD data; (e) setting, as the mode of the target block, a third mode if the MVD equals to zero and the MCE is not greater than the threshold and a fourth mode if the MVD is other than zero and the MCE is not greater than compared with the threshold; (f) if none of the third and the fourth mode is determined as the mode of the target block in step (d), generating intra-coded data and inter-coded data, the intra-coded data being generated by encoding the pixels of the target block based on predetermined pixels of the current picture and the inter-coded data being provided by encoding the pixels of the target block based on preset pixels included in the current picture and the motion compensated block; (g) comparing the number of bits of the intra-coded data and that of the inter-coded data; (h) if the number of bits of the intra-coded data is not greater than that of the inter-coded data, deciding a fifth mode as the mode of the target block; and (i) if the fifth mode is not decided in step (h), setting, as the mode of the target block, a sixth mode if the MVD is zero and a seventh mode if the MVD is not zero.

In accordance with another aspect of the present invention, there is provided an apparatus for coding a target block of a binary shape signal, wherein the binary shape signal includes a plurality of pictures and each picture is divided into a multiplicity of blocks of M×N pixels having one of a first and a second binary values, the target block respectively one of the blocks of a current picture to be encoded and M and N being positive integers, respectively, comprising: mode detection means, responsive to the target block, for generating first indication signals of a type 1 and a type 2 if errors of the target block with respect to a first and a second reference blocks are not greater than a predetermined threshold, respectively, the respective reference blocks having M×N pixels and all pixels of the first and the second reference blocks being of the first and the second binary values, respectively; reconstruction means for reconstructing an encoded binary shape signal, thereby generating and storing the reconstructed binary shape signal; motion estimation and compensation means for motion estimating the target block with respect to the reconstructed binary shape signal corresponding to one or more previous pictures of the current picture to thereby generate motion vector information and a motion compensated block, the motion vector information including a motion vector and the motion compensated block including a most similar block of the target block; mode selection means for calculating a motion compensation error(MCE) between the target block and the most similar block and generating a second indication signal if the MCE is not greater than the threshold; motion vector difference(MVD) determination means for calculating a MVD between the motion vector and its predictor and encoding the MVD to generate encoded MVD data; coding means, responsive to the target block, the motion compensated block and the reconstructed binary shape signal, for intra- and inter-coding the target block to generate intra- and inter-coded data, respectively, thereby selecting either one of the intra- and the inter-coded data based on the numbers of bits of the intra- and inter-coded data and providing a third indication signal of a type 3 if the intra-coded data is selected and a third indication signal of a type 4 if the inter-coded data is selected; formatting means, responsive to the MVD, the encoded MVD data, the coded data and the indication signals, for determining a mode of the target block and generating encoded target block data based on the determined mode.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

In accordance with the present invention, there is provided a method and an apparatus for efficiently coding a binary shape signal on a picture-by-picture basis, wherein a picture represents a frame of a field. In a preferred embodiment of the present invention, a picture is treated as a field and the present invention will be described with reference to the coding of the binary shape signal on a field-by-field basis in order to accommodate a large motion of an object. The binary shape signal includes a previous and a current frames, the previous frame is separated into a previous top and a previous bottom fields, and the current frame is separated into a current top and a current bottom fields. The method and apparatus in accordance with the present invention processes the fields in order of the previous top field, the previous bottom field, the current top field, and the current bottom field. Each field is partitioned into blocks of P×Q binary pixels with P and Q being positive integers, wherein each block is referred to as either a top field BAB or a bottom field BAB. In a preferred embodiment of the invention, P and Q are both set to 16 and in another preferred embodiment, P and Q are set to 8 and 16, respectively.

Figure 2:
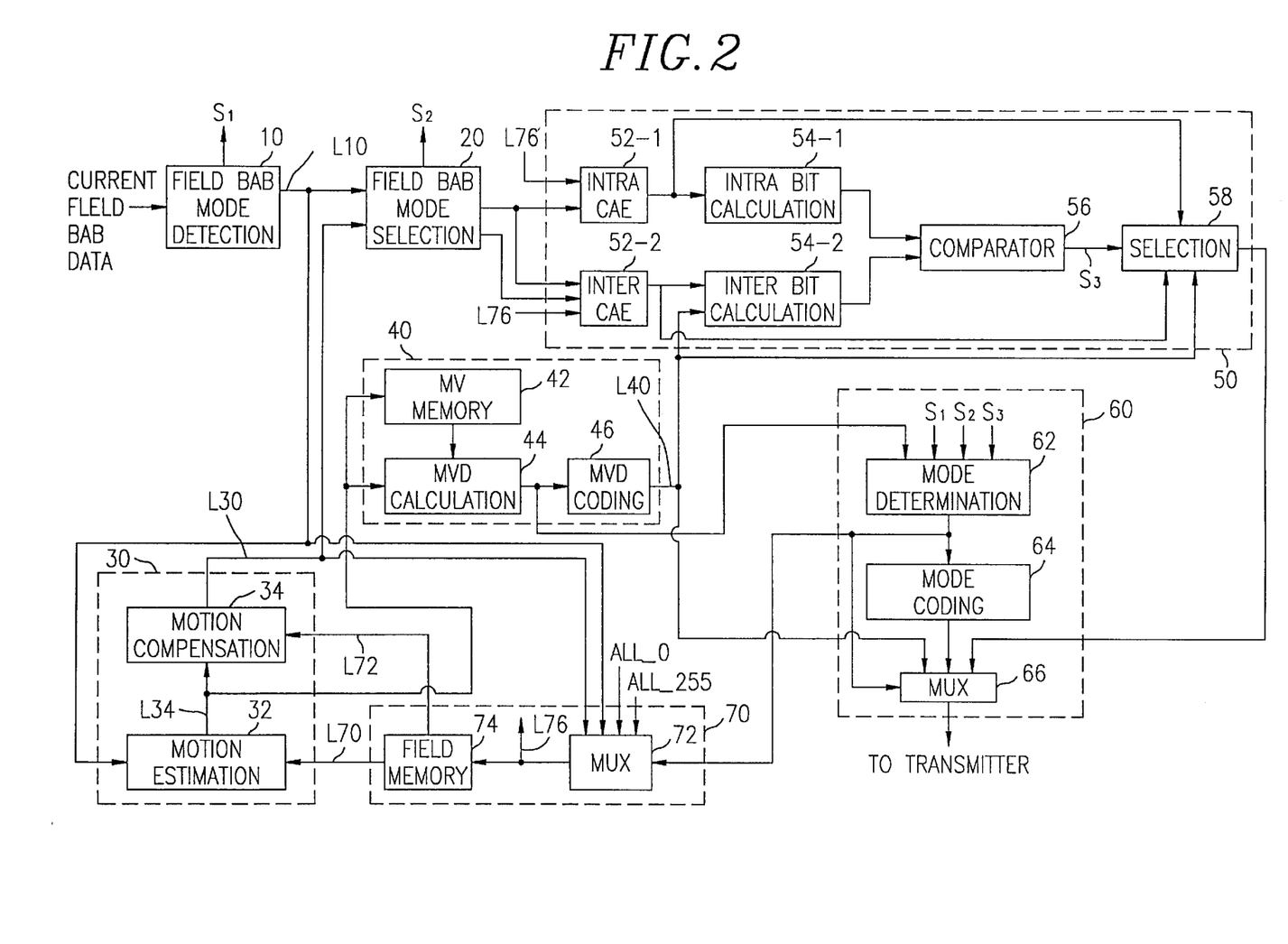
FIG. 2 illustrates an interlaced binary shape signal coding apparatus in accordance with the present invention.

Referring to FIG. 2, an apparatus for encoding an interlaced binary shape signal in accordance with the present invention is illustrated. Current top field BAB data or current bottom field BAB data is provided to a field BAB mode detection block 10, wherein the current top field BAB data contains binary pixel data of a current top field BAB; and the current bottom field BAB data contains binary pixel data of a current bottom field BAB. In binary pixel data, an object and a background pixel are represented by binary numbers, e.g., 255 and 0, respectively.

The field BAB mode detection block 10 examines whether a coding mode of current field BAB is "all_0" or "all_255". Specifically, a current field BAB is partitioned into T×S pixels, e.g., 4×4 pixels, T and S being positive integers, wherein a field BAB of 16×16 pixels of the first embodiment includes 4×4 subblocks therein and a field BAB of 8×16 pixels includes 2×4 subblocks. If an error between any subblock of the current field BAB and a subblock of an all_0 field BAB is smaller than or equal to a predetermined threshold, an indication signal S1 of type 1 which indicates that the coding mode of the current field BAB is "all_0" is provided from the field BAB mode detection block 10 to a mode determination block 62 within a formatting unit 60, wherein the all_0 field BAB is a field BAB in which each pixel value is 0. If an error between any subblock of the current field BAB and a subblock of an all_255 field BAB is smaller than or equal to the predetermined threshold, an indication signal S1 of type 2 which indicates that the coding mode of the current field BAB is "all_255" is provided from the field BAB mode detection block 10 to the mode detection block 62, wherein the all_255 field BAB is a field BAB each of whose pixel values is 255.

If the coding mode of the current field BAB is determined as neither "all_0" nor "all_255", the field BAB mode detection block 10 provides the current field BAB data to a field BAB mode selection block 20, a motion estimation block 32 within a motion estimation and compensation unit 30, and a first multiplexor(MUX) 72 within a field reconstruction unit 70 via a line L10. The field BAB mode selection block 20 is also provided with motion compensated field BAB data from a motion compensation block 34 within the motion estimation and compensation unit 30 via a line L30. The motion estimation and compensation process will be described for two separate cases whose current field BAB corresponds to a top field BAB and a bottom field BAB, respectively.

In a field memory 74 within the field reconstruction unit 70, reconstructed field data is stored, wherein the reconstructed field data represents information on two previously encoded fields right before the current field. If the current field BAB is a top field BAB contained in the current top field, the motion estimation block 32 extracts reconstructed previous top field data and reconstructed previous bottom field data from the field memory 74 via a line L70; and if the current field BAB is a bottom field BAB contained in the current bottom field, the motion estimation block 32 extracts the reconstructed previous bottom field data and reconstructed current top field data from the field memory 74 via the line L70. The current field BAB data is also provided to the motion estimation block 32 from the field BAB mode detection block 10 via the line L10.

Figure 3:
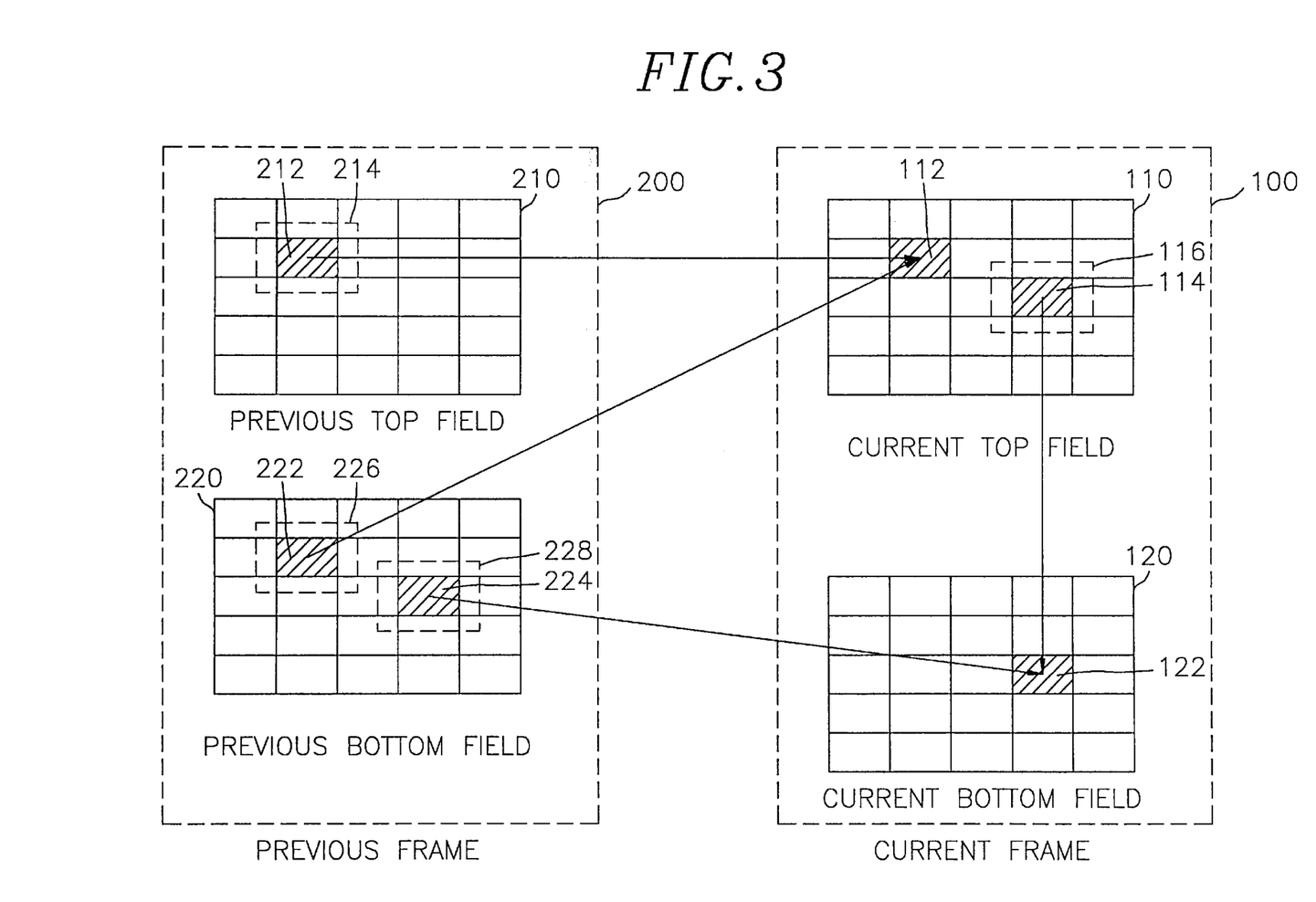
FIG. 3 shows motion estimation process of a field BAB in accordance with the present invention.

Referring to FIG. 3, a motion estimation and compensation process in accordance with the preferred embodiment of the present invention is depicted. A current frame 100 includes a current top field 110 and a current bottom field 120 and a previous frame 200 includes a previous top field 210 and a previous bottom field 220.

If the current field BAB is a top field BAB contained in the current top field 110, e.g., a current top field BAB 112, the motion estimation block 32 detects a first previous bottom field BAB 222 in the previous bottom field 220, wherein the first previous bottom field BAB 222 is located at a same position in the previous bottom field 220 as the one of the current top field BAB 112 in the current top field 110. Then the current top field BAB 112 is displaced on a pixel-by-pixel basis within a first previous bottom search region 226 formed in the previous bottom field 220, wherein the first previous bottom search region 226 has a plurality of candidate field BAB's including the first previous bottom field 222. At each displacement, an error between the current top field BAB 112 and a corresponding candidate field BAB is calculated.

And then the motion estimation block 32 detects a previous top field BAB 212 in the previous top field 210, wherein the previous top field BAB 212 is located at a same position as the current top field BAB 112. Then the current top field BAB 112 is displaced on a pixel-by-pixel basis within a previous top search region 214 formed in the previous top field 210, wherein the previous top search region 214 has a plurality of candidate field BAB's including the previous top field BAB 212. At each displacement, an error between the current top field BAB 112 and a corresponding candidate field BAB is also calculated.

Similarly, if the current field BAB is a bottom field BAB contained in the current bottom field 120, e.g., a current bottom field BAB 122, the motion estimation block 32 detects a current top field BAB 114 in the current top field 110, wherein the current top field BAB 114 is located at a same position as the current bottom field BAB 122. Then the current bottom field BAB 122 is displaced on a pixel by pixel basis within a current top search region 116 formed in the current top field 110, wherein the current top search region 116 has a multiplicity of candidate field BAB's including the current top field BAB 114. At each displacement, an error between the current bottom field BAB 122 and a corresponding candidate field BAB is calculated.

And then the motion estimation block 32 detects a previous bottom field BAB 224 in the previous bottom field 220, wherein the previous bottom field BAB 224 is located at a same position as the current bottom field BAB 122. Then the current bottom field BAB 122 is displaced on a pixel-by-pixel basis within a second previous bottom search region 228 formed in the previous bottom field 220, wherein the second previous bottom search region 228 has a multiplicity of candidate field BAB's including the previous bottom field BAB 224. At each displacement, an error between the current bottom field BAB 122 and a corresponding candidate field BAB is also calculated.

As described above, the motion estimation block 32 performs motion estimation of a current field BAB with respect to its two previous fields and selects, as an optimum candidate field BAB or a most similar field BAB, a candidate field BAB which yields a minimum error. Outputs from the motion estimation block 32 are a current motion vector and a field indication flag on a line L34 leading to a motion vector memory(MV memory) 42 and a motion vector difference(MVD) calculation block 44 within a motion vector difference determination unit 40 and the motion compensation block 34, wherein the current motion vector denotes a displacement between the current field BAB and the optimum candidate field BAB and the field indication flag represents to which field the optimum candidate field BAB belongs.

The motion compensation unit 34 extracts bordered field BAB data from the field memory 74 via a line L72, wherein the bordered field BAB data represents pixel data on the optimum candidate field BAB and a border of width 1 pixel therearound; and provides the bordered field BAB data as motion compensated field BAB data to the field BAB mode selection block 20 and the first MUX 72 via the line L30.

The MVD calculation block 44, responsive to the current motion vector and the field indication flag from the motion estimation block 32 on the line L34, extracts a motion vector predictor from the MV memory 42, wherein the motion vector predictor is a motion vector of one of preset neighboring field BAB's of the current field BAB determined according to MPEG-4 supra. Then a motion vector difference(MVD) between the current motion vector and the corresponding motion vector predictor is calculated. The MVD and the field indication flag are provided to a MVD coding block 46 within the motion vector difference determination unit 40 and the mode determination block 62.

The MVD coding block 46 encodes the MVD, if and only if the MVD has a value other than zero, and the field indication flag from the MVD calculation block 44, and provides the encoded MVD if there is one and the encoded field indication flag as encoded MVD data to an inter bit calculation block 54-2 and a selection block 58 within a context based arithmetic encoding(CAE) unit 50 and a second multiplexor(MUX) 66 within the formatting unit 60 via a line L40, wherein the CAE unit 50 includes an intra-CAE and an inter-CAE blocks 52-1 and 52-2, an intra-bit and the inter-bit calculation blocks 54-1 and 54-2, a comparator 56 and the selection block 58.

Meantime, in response to the current field BAB data on the line L10 and the motion compensated field BAB data on the line L30, the field BAB mode selection block 20 divides the current field BAB and the optimum candidate field BAB included in the motion compensated field BAB into subblocks of 4×4 pixels. If an error between any of the subblocks within the current field BAB and its corresponding subblock within the optimum candidate field BAB is smaller than or equal to the predetermined threshold, the field BAB mode selection block 20 generates an indication signal S2, which indicates that the current BAB field need not be encoded, and provides same to the mode determination block 62.

If any of the errors between the respective subblocks in the current field BAB and their corresponding subblocks in the optimum candidate field BAB is greater than the predetermined threshold, the field BAB mode selection block 20 provides the current field BAB data to the intra-CAE block 52-1 and the inter-CAE block 52-2 and the motion compensated field BAB data to the inter-CAE block 52-2.

The intra-CAE block 52-1 generates an intra-context for each pixel in the current field BAB based on the current field BAB itself and previously reconstructed field BAB's positioned therearound fed on a line L76 from the first MUX 72; and encodes the current field BAB by using the conventional intra-CAE technique based on the generated intra-context. The intra-CAE data for the current field BAB is provided to the intra-bit calculation block 54-1 and the selection block 58.

The intra-bit calculation block 54-1 calculates the number of bits of the intra-CAE data and provides the calculated number of bits to the comparator 56.

The inter-CAE block 52-2 generates an inter-context for each pixel in the current field BAB based on the previous reconstructed field BAB's on the line L76 and the motion compensated field BAB from the field BAB mode selection block 20; and encodes the current field BAB based on the conventional inter-CAE technique. The inter-CAE data for the current field BAB is fed to the inter-bit calculation block 54-2 and the selection block 58.

The inter bit calculation block 54-2, responsive to the encoded MVD data on the line L40 and the inter-CAE data from the inter-CAE block 52-2, calculates the number of combined bits of the encoded MVD data and the inter-CAE data and provides the calculated number of bits to the comparator 56.

The comparator 56 compares the number of bits of the intra-CAE data with the number of bits of the inter-CAE data and the encoded MVD data. If the number of bits of the intra-CAE data is smaller than the number of bits of the inter-CAE data and the encoded MVD data, the comparator 56 provides an indication signal S3 of type 3 to the selection block 58 and the mode determination block 62; and if otherwise, the comparator 56 provides an indication signal S3 of type 4 to the selection block 58 and the mode determination block 62.

The selection block 58 selects either the intra-CAE data or the inter-CAE data and the encoded MVD data in response to the indication signal S3 of type 3 or 4 to thereby provide the selected result to the second MUX 66 in the formatting unit 60.

The mode determination block 62 determines the coding mode of the current field BAB based on the indication signals S1, S2, S3, and the MVD from the field BAB mode detection block 10, the field BAB mode selection block 20, the comparator 56 and the MVD calculation block 44, respectively, and provides a determined mode signal to a mode coding block 64 and the second MUX 66 within the formatting unit 60 and the first MUX 72. Table 2 shows how to determine the coding mode of the current field BAB in accordance with the present invention.

Specifically, mode 1 is determined for the current field BAB when S2 exists and MVD=0; mode 2, when S2 exists and MVD≠0; mode 3, when S1 of type 1 exists; mode 4, when S1 of type 2 exists; mode 5, when S3 of type 3 exists regardless of the value of MVD; mode 6, when S3 of type 4 exists and MVD=0; and mode 7, when S3 of type 4 exists and MVD≠0, wherein a reference mark "x" represents that the corresponding signal is not available.

TABLE 2 determination of coding modes

| S1 | S2 | S3 | MVD | mode |
|---|---|---|---|---|
| x | o | x | = 0 | mode 1 |
| x | o | x | ≠ 0 | mode 2 |
| type 1 | x | x | x | mode 3 |
| type 2 | x | x | x | mode 4 |
| x | x | type 3 | = 0 or ≠ 0 | mode 5 |
| x | x | type 4 | = 0 | mode 6 |
| x | x | type 4 | ≠ 0 | mode 7 |

The first MUX 72 reconstructs field BAB data corresponding to the current field BAB in response to the mode signal from the mode determination block 62. In other words, the first MUX 72 provides the all_0 field BAB to the field memory 74 via the line L76 in response to the mode 3 signal; the all_255 field BAB, in response to the mode 4 signal; the current field BAB in response to the mode 5, 6, or 7 signal; and the optimum candidate field BAB in response to the mode 1 or 2 signal.

The mode coding block 64 encodes the mode signal from the mode determination block 62, e.g., through the use of a conventional VLC technique and provides the encoded mode signal to the second MUX 66.

In response to the mode signal from the mode determination block 62, the second MUX 66 selectively multiplexes the signals inputted thereto and provides the multiplexed signal as encoded current field BAB data to a transmitter(not shown) for the transmission thereof. The encoded current field BAB data is the encoded mode signal and the encoded MVD data in case of the mode 1 or 2 signals; the encoded mode signals only in case of the mode 3 or 4 signals; the intra-CAE data in case of the mode 5 signal; and the encoded mode signal, the inter-CAE data and the encoded MVD data in case of the mode 6 or 7 signal. Please note that the encoded MVD data includes the encoded field indication signal when the MVD equals to zero as in the case of mode 1 or 6.

Figure 4A:
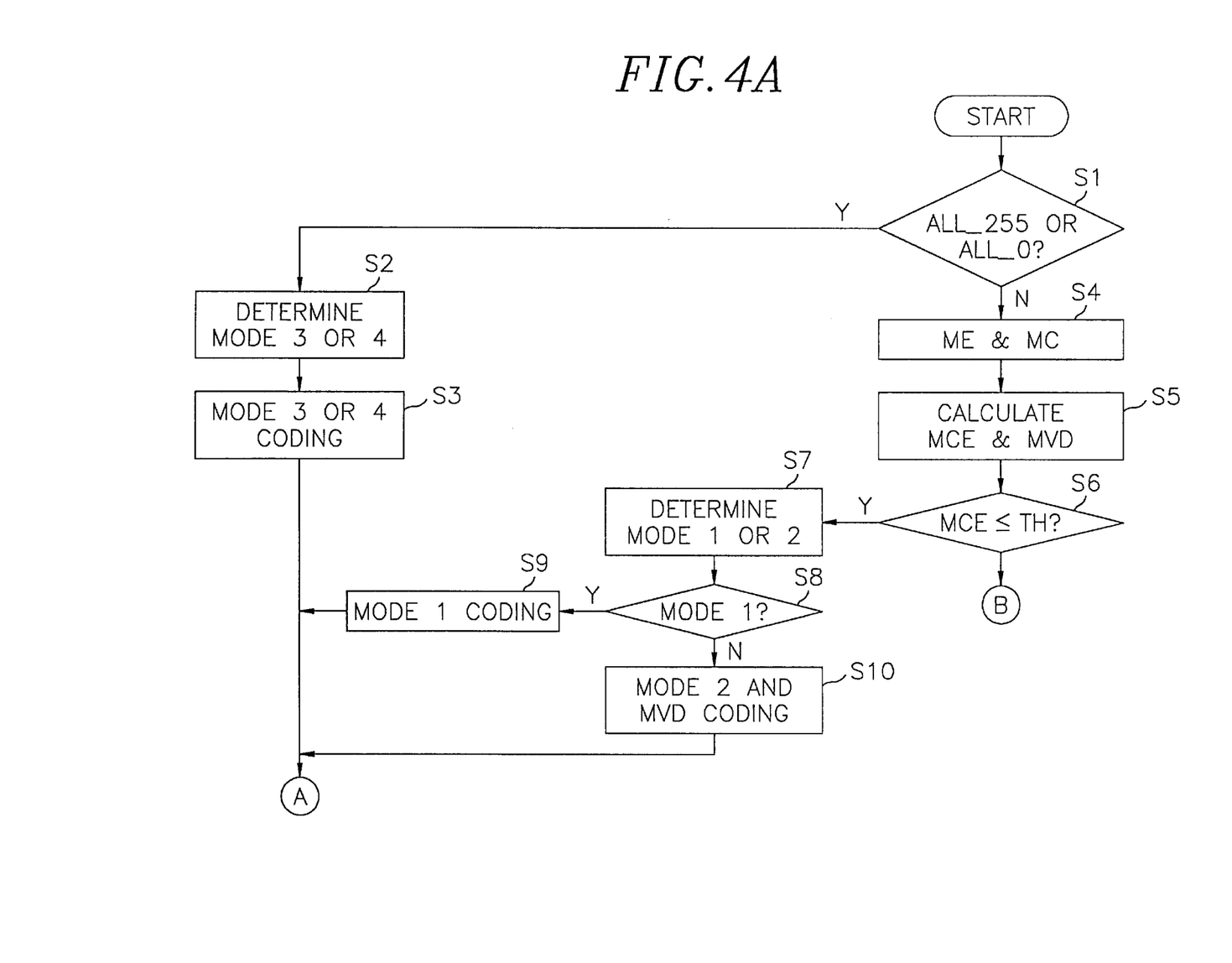
FIGS. 4A and 4B provide a flow chart showing an encoding process in accordance with the present invention.
Figure 4B:
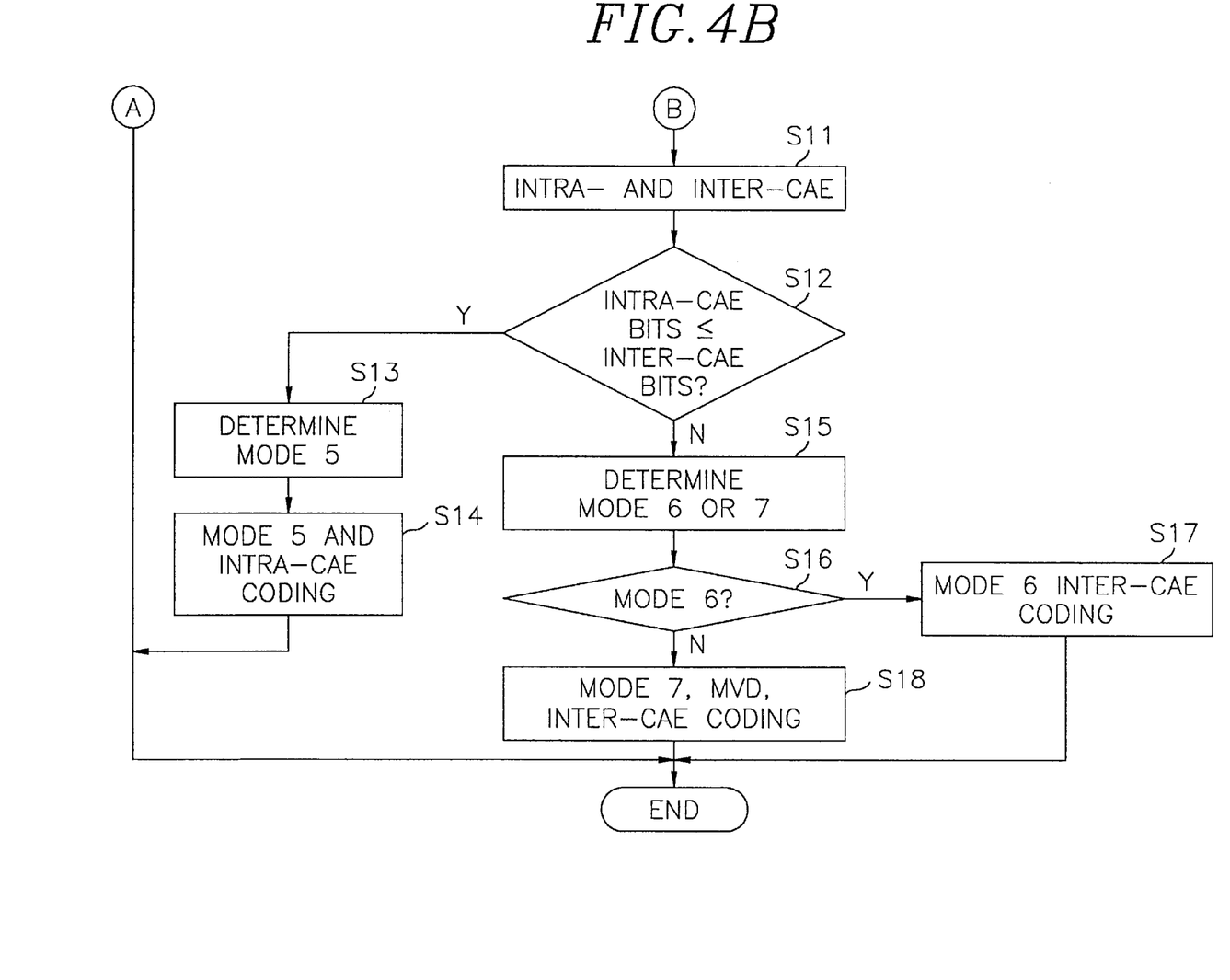

Referring to FIGS. 4A and 4B, there is illustrated a procedure of encoding the binary shape signal based on a field basis in accordance with the present invention. At step S1, it is determined whether the pixels in a current field BAB can be replaced by all 255's or all 0's and then, at step S2, a mode of the current field BAB is determined as the mode 3 if all the pixels in the current field BAB can be represented by 0's; and the mode 4, if all the pixels are represented by 255's, as done at the field BAB mode detection block 10 shown in FIG. 2. If the mode of the current field BAB is determined to be the mode 3 or 4, the mode signal is encoded at step S3 and the procedure terminates by transmitting the encoded mode signal.

If the determination result is negative at step S1, the procedure proceeds to step S4, wherein the motion estimation and compensation for the current field BAB is executed in the motion estimation and compensation unit 30 in FIG. 2 to thereby generate a motion compensated field BAB, a current motion vector and a field indication flag(FIF). At step S5, a motion compensation error(MCE) and a MVD are calculated at the field BAB mode selection block 20, wherein the MCE represents an error between the current field BAB and an optimum candidate field BAB included in the motion compensated field BAB.

At step S6, the MCE is compared with a predetermined threshold(TH); and if the MCE is equal to or smaller than the TH, the procedure goes to step S7. At step S7, a mode of the current field BAB is determined as the mode 1 if the MVD is zero and the mode 2 if otherwise. At step S8, it is examined whether the mode of the current field BAB is the mode 1 or 2. If it is found that the mode 1 has been assigned to the current field BAB, the mode 1 signal and the FIF generated at step S4 are encoded at step S9 and the procedure terminates. If a mode of the current field BAB is found to be the mode 2, the mode 2 signal, the FIF and the MVD are encoded at step S10 and the procedure terminates by transmitting the encoded data.

Referring to step S6, if it is decided the MCE is greater than the TH, the procedure goes to step S11 via a node B. At step S11, the current field BAB is encoded by the intra-CAE and the inter-CAE coding schemes and the number of bits corresponding to the intra-CAE data and the one for the inter-CAE data are generated, as described with reference to the intra-CAE and inter-CAE blocks 52-1, 52-2 and the intra-bit calculation and inter-bit calculation blocks 54-1, 54-2 shown in FIG. 2. If it is determined at step S12 that the number of intra-CAE bits is equal to or smaller than the number of inter-CAE bits, the procedure goes to step S13 and step S15 if otherwise.

At step S13, the mode of the current field BAB is set to be the mode 5 and at step S14, the mode 5 signal is encoded and the procedure terminates by transmitting the encoded mode signal and the intra-CAE data. At step S15, the mode of the current field BAB is determined as the mode 6 if the MVD equals to zero and the mode 7 if otherwise, and the procedure proceeds to step S16. At step S16, it is checked whether the mode is 6 or not. If the mode is determined as 6 at step S16, the mode 6 signal and the FIF are encoded and transmitted together with the inter-CAE data at step S17 and the procedure terminates. On the other hand, if it is found that the mode of the current field BAB is the mode 7, the procedure goes to step S18. Finally at step S18, the mode 7 signal, the FIF and the MVD are encoded and transmitted along with the inter-CAE data to the transmitter and the procedure terminates.

Even though the present invention has been described with reference to the coding of a binary shape signal on a field-by-field basis, the same scheme can be extended in coding the binary shape signal on a frame-by-frame basis. In such an instance, a motion estimation and compensation process would be carried out with reference to a previous frame in lieu of two preceding fields.

While the present invention has been described with respect to certain preferred embodiments only, other modifications and variations may be made without departing from the spirit and scope of the present invention as set forth in the following claims.

What is claimed is:

1. A method for encoding a target block of a binary shape signal, wherein the binary shape signal includes a plurality of pictures and each picture is divided into a multiplicity of blocks of M×N pixels having one of a first and a second binary values, the target block representing one of the blocks of a current picture to be encoded and M and N being positive integers, respectively, comprising the steps of:

(a) determining, as a mode of the target block, a first mode if an error of the target block with respect to a first reference block is not greater than a predetermined threshold and a second mode if an error of the target block with respect to a second reference block is not greater than the threshold, the respective reference blocks having M×N pixels and all pixels of the first and the second reference blocks being of the first and the second binary values, respectively;

(b) if none of the first and the second modes is determined as the mode of the target block in step (a), motion estimating and compensating the target block with reference to one or more previous pictures of the current picture to thereby generate motion vector information including a motion vector and a motion compensated block, the motion compensated block including a most similar block of the target block;

(c) calculating a motion compensation error(MCE) between the target block and the most similar block and a motion vector difference(MVD) between the motion vector and its predictor;

(d) encoding the MVD if the MVD is not zero to provide encoded MVD data;

(e) setting, as the mode of the target block, a third mode if the MVD equals to zero and the MCE is not greater than the threshold and a fourth mode if the MVD is other than zero and the MCE is not greater than the threshold;

(f) if none of the third and the fourth mode is determined as the mode of the target block in step (e), generating intra-coded data and inter-coded data, the intra-coded data being generated by encoding the pixels of the target block based on predetermined pixels of the current picture and the inter-coded data being provided by encoding the pixels of the target block based on preset pixels included in the current picture and the motion compensated block;

(g) comparing the number of bits of the intra-coded data and that of the inter-coded data;

(h) if the number of bits of the intra-coded data is not greater than that of the inter-coded data, deciding a fifth mode as the mode of the target block; and (i) if the fifth mode is not decided in step (h), setting, as the mode of the target block, a sixth mode if the MVD is zero and a seventh mode if the MVD is not zero.

2. The method according to claim 1, further comprising, after the step (i) the steps of:

(j) encoding the mode of the target block to generate an encoded mode signal; and (k) generating encoded data of the target block based on the mode thereof.

3. The method according to claim 2, wherein the encoded data of the target block includes the encoded mode signal and further includes the encoded MVD data for the fourth mode; the intra-coded data for the fifth mode; the inter-coded data for the sixth mode; and the inter-coded data and the encoded MVD data for the seventh mode.

4. The method according to claim 3, wherein the intra-coded data is provided by an intra-context based arithmetic encoding(CAE) method.

5. The method according to claim 4, wherein the inter-coded data is provided by an inter-CAE method.

6. The method according to claim 5, wherein a picture corresponds to a frame.

7. The method according to claim 6, wherein the motion estimating and compensating step (b) is carried out with reference to a previous frame of the current frame.

8. The method according to claim 5, wherein a picture corresponds to a field.

9. The method according to claim 8, wherein the motion estimating and compensating step (b) is carried out with reference to two previous fields of the current field.

10. The method according to claim 9, wherein the motion vector information in step (b) further includes a field indication flag indicating a field which includes the motion compensated block.

11. The method according to claim 10, wherein the encoding step (d) includes the steps of (d1) encoding the field indication flag to generate an encoded flag signal.

12. The method according to claim 11, wherein in the step (h) the fifth mode is decided if the number of bits of the intra-coded data is not greater than the number of combined bits of the inter-coded data, the encoded MVD data and the encoded flag signal.

13. An apparatus for coding a target block of a binary shape signal, wherein the binary shape signal includes a plurality of pictures and each picture is divided into a multiplicity of blocks of M×N pixels having one of a first and a second binary values, the target block representing one of the blocks of a current picture to be encoded and M and N being positive integers, respectively, comprising:

mode detection means, responsive to the target block, for generating first indication signals of a type 1 and a type 2 if errors of the target block with respect to a first and a second reference blocks are not greater than a predetermined threshold, respectively, the respective reference blocks having M×N pixels and all pixels of the first and the second reference blocks being of the first and the second binary values, respectively;

reconstruction means for reconstructing an encoded binary shape signal, thereby generating and storing the reconstructed binary shape signal, wherein the reconstructed binary shape signal includes previously encoded pictures;

motion estimation and compensation means for motion estimating the target block with respect to the reconstructed binary shape signal corresponding to one or more previous pictures of the current picture to thereby generate motion vector information and a motion compensated block, the motion vector information including a motion vector and the motion compensated block including a most similar block of the target block;

mode selection means for calculating a motion compensation error(MCE) between the target block and the most similar block and generating a second indication signal if the MCE is not greater than the threshold;

motion vector difference(MVD) determination means for calculating a MVD between the motion vector and its predictor and encoding the MVD to generate encoded MVD data;

coding means, responsive to the target block, the motion compensated block and the reconstructed binary shape signal, for intra- and inter-coding the target block to generate intra- and inter-coded data, respectively, thereby selecting either one of the intra- and the inter-coded data based on the numbers of bits of the intra- and inter-coded data and providing a third indication signal of a type 3 if the intra-coded data is selected and a third indication signal of a type 4 if the inter-coded data is selected; and formatting means, responsive to the MVD, the encoded MVD data, the coded data and the indication signals, for determining a mode of the target block and generating encoded target block data based on the determined mode.

14. The apparatus according to claim 13, wherein the MVD determination means includes:

means for storing motion vectors of previously encoded blocks of the current picture;

means for retrieving one of the stored motion vectors from the storing means as the predictor of motion vector of the target block to thereby calculate the MVD; and MVD means for encoding the MVD to provide the encoded MVD data.

15. The apparatus according to claim 14, wherein the coding means includes:

means for intra-coding the target block based on pixels included in a portion of the reconstructed binary shape signal corresponding to the current picture to thereby generate the intra-coded data;

means for inter-coding the target block based on pixels included in the portion of the reconstructed binary shape signal and the motion compensated block to generate the inter-coded data;

means for finding the number of bits of the intra-coded data;

means for calculating a sum of the number of bits of the inter-coded data and the number of bits of the encoded MVD data;

means for comparing the number of bits of the intra-coded data and the sum to thereby generate the third indication signal of the type 3 if the sum is greater than the number of bits of the intra-coded data and the third indication signal of the type 4 if otherwise; and means for selecting, as the coded data, the intra-coded data in response to the third indication signal of the type 3 and the inter-coded data in response to the third indication signal of the type 4.

16. The apparatus according to claim 15, wherein the formatting means includes:

deciding means for determining the mode of the target block in response to the first to the third indication signals and the MVD, wherein a first mode is determined as the mode of the target block if the first indication signal of the type 1 is received, a second mode if the first indication signal of the type 2 is received, a third mode if the second indication signal is received and the MVD is zero, a fourth mode if the second indication signal is received and the MVD is not zero, a fifth mode if the third indication signal of the type 3 is received, a sixth mode if the third indication signal of the type 4 is received and the MVD is zero, and a seventh mode if the third indication signal of the type 4 is received and the MVD is not zero;

means for encoding the mode of the target block to provide an encoded mode signal; and providing means for generating the encoded target block data in response to the determined mode, the coded data and the encoded mode signal, wherein the encoded mode signal is generated as the encoded target block data if the determined mode is one of the first, the second and the third modes, the encoded mode signal and the encoded MVD data if the determined mode is the fourth mode, the encoded mode signal and the coded data if the determined mode is either one of the fifth and the sixth mode, and the encoded mode signal, encoded MVD data and the coded data if the determined mode is the seventh mode.

17. The apparatus according to claim 16, wherein a picture corresponds to a field and the target block is motion estimated with reference to two preceding fields of the current field.

18. The apparatus according to claim 17, wherein the motion vector information further includes a field indication flag indicating a field including the most similar block.

19. The apparatus according to claim 18, wherein the MVD means includes means for encoding the field indication flag to provide encoded flag signal.

20. The method according to claim 19, wherein the encoded target block data further includes the encoded flag signal if the determined mode corresponds to the third, the fourth, the sixth or the seventh mode.

* * * * *